US012621750B2

(12) United States Patent
Grießbach et al.

(10) Patent No.: US 12,621,750 B2
(45) Date of Patent: May 5, 2026

(54) GEOGRAPHIC LOCATION-BASED SIM SWITCHING

(71) Applicant: NXP B.V., Eindhoven (NL)

(72) Inventors: Jan Grießbach, Hamburg (DE); Till Steffen Witt, Bremen (DE); Javier Velasquez Gomez, Hamburg (DE); Nicolas Harmen Lehment, Munich (DE)

(73) Assignee: NXP B.V., Eindhoven (NL)

( * ) Notice: Subject to any disclaimer, the term of this patent is extended or adjusted under 35 U.S.C. 154(b) by 365 days.

(21) Appl. No.: 18/340,493

(22) Filed: Jun. 23, 2023

(65) Prior Publication Data

US 2024/0031913 A1 Jan. 25, 2024

(30) Foreign Application Priority Data

Jul. 22, 2022 (EP) .................................... 22186425

(51) Int. Cl.
*H04W 48/04* (2009.01)
*H04W 48/18* (2009.01)
*H04W 88/06* (2009.01)
(52) U.S. Cl.
CPC ........... *H04W 48/04* (2013.01); *H04W 48/18* (2013.01); *H04W 88/06* (2013.01)
(58) Field of Classification Search
CPC ..... H04W 48/04; H04W 48/18; H04W 88/06; H04W 4/021; H04W 4/029; H04W 64/00; H04W 4/025; H04W 8/183
See application file for complete search history.

(56) References Cited

U.S. PATENT DOCUMENTS

| | | | |
|---|---|---|---|
| 9,520,911 B2 | 12/2016 | Selvaraj et al. | |
| 9,924,438 B1 * | 3/2018 | Guo ..................... | H04W 36/302 |
| 10,021,634 B2 | 7/2018 | Liu | |
| 11,825,329 B1 * | 11/2023 | Shah ..................... | H04W 48/04 |
| 2011/0081951 A1 | 4/2011 | Hwang | |
| 2014/0012562 A1 | 1/2014 | Chang et al. | |
| 2014/0274006 A1 * | 9/2014 | Mutya ..................... | H04W 4/16 |
| | | | 455/416 |
| 2016/0302171 A1 | 10/2016 | Krauss et al. | |
| 2020/0008007 A1 | 1/2020 | Belghoul et al. | |
| 2020/0314629 A1 | 10/2020 | Kreishan | |
| 2022/0053607 A1 * | 2/2022 | Rice ..................... | H04W 72/569 |

(Continued)

FOREIGN PATENT DOCUMENTS

| | | |
|---|---|---|
| CN | 104954564 A | 9/2015 |
| CN | 105188158 A | 12/2015 |

(Continued)

*Primary Examiner* — Julio R Perez

(57) ABSTRACT

The disclosure relates to switching SIMs in a mobile telecommunications device based on geographic location. Example embodiments disclosed include a method of operating a mobile telecommunications device having a first SIM and a second SIM, the method comprising: identifying a geographic location of the device; operating the device using the first SIM to connect to a first network if the device is within a first geographic location; and operating the device using the second SIM to connect to a second network if the device is within a second geographic location and if a received signal strength indicator, RSSI, of the second network is greater than a predefined threshold value.

21 Claims, 4 Drawing Sheets

(56) References Cited

U.S. PATENT DOCUMENTS

| | | | | |
|---|---|---|---|---|
| 2024/0031913 A1* | 1/2024 | Grießbach | ........... | H04W 48/04 |
| 2024/0073315 A1* | 2/2024 | Gamkrelidze | ........ | G06F 1/1673 |
| 2025/0175784 A1* | 5/2025 | Raasch | ................. | H04W 8/183 |

FOREIGN PATENT DOCUMENTS

| | | | | |
|---|---|---|---|---|
| CN | 104683549 B | 4/2018 | | |
| CN | 111373777 A | 7/2020 | | |
| WO | WO-2009038940 A1 * | 3/2009 | ........... | H04W 36/14 |
| WO | 2014012562 A1 | 1/2014 | | |

* cited by examiner

GEOGRAPHIC LOCATION-BASED SIM SWITCHING

CROSS-REFERENCE TO RELATED APPLICATIONS

This application claims priority under 35 U.S.C. § 119 to European Patent Application No. 22186425.9, filed on Jul. 22, 2022, the contents of which are incorporated by reference herein.

FIELD

The disclosure relates to switching SIMs in a mobile telecommunications device based on geographic location.

BACKGROUND

Modern mobile telecommunications devices can be configured to operate using more than one subscriber identification module (SIM), enabling a device to switch between SIMs to operate under different networks. A dual SIM enabled device may for example automatically switch between first and second networks for respective first and second SIMs based on coverage of the networks. A device may for example switch between SIMs based on a radio signal strength indication, or RSSI, switching to a different network when a measured RSSI for one network becomes low and an alternative network RSSI is higher. A potential problem with this approach, however, is when two networks operate according to different cost structures, which can result in a device switching to a more costly network based only on RSSI when an existing network may still be adequate. Selecting which network to use based only on signal strength may not therefore always be the optimum solution.

SUMMARY

According to a first aspect there is provided a method of operating a mobile telecommunications device having a first subscriber identification module (SIM) and a second SIM, the method comprising:

identifying a geographic location of the device;
  operating the device using the first SIM to connect to a first network if the device is within a first geographic location; and
  operating the device using the second SIM to connect to a second network if the device is within a second geographic location and if a received signal strength indicator (RSSI) of the second network is greater than a predefined threshold value.

The geographic location of the device may be identified using a global navigation satellite system (GNSS) receiver on the device. The geographic location may alternatively or additionally be identified using other methods such as UWB localization, which may be more accurate particularly for indoor localization.

The first geographic location may be defined by a first plurality of coordinates defining a first geofence.

The second geographic location may be defined by a second plurality of coordinates defining a second geofence. The second geographic location may alternatively be defined by being outside of the first geographic location.

The first and second SIMs, and any additional SIMs, may be provided in the device in a removable Universal Integrated Circuit Card (UICC) or in an embedded UICC (eUICC) or an integrated UICC (iUICC).

Depending on the standards supported by the device, the first and/or second network may be LTE, 5G or eventually 6G. The first network and/or the second network may for example be a 5G network.

The predefined threshold value may be relative to an RSSI of the first network.

According to a second aspect there is provided a mobile telecommunications device comprising:

a geographic location module;
  a controller;
  a first subscriber identification module (SIM);
  a second SIM; and
  a transceiver,
  wherein the controller is configured to:
  identify a geographic location of the device using the geographic location module;
  operate the device using the first SIM and the transceiver to connect to a first network if the device is within a first geographic location; and
  operate the device using the second SIM to connect to a second network if the device is within a second geographic location and if a received signal strength indicator (RSSI) of the second network is greater than a predefined threshold value.

The geographic location module may comprise a global navigation satellite system (GNSS) receiver.

The first geographic location may be defined by a first plurality of coordinates defining a first geofence.

The second geographic location may be defined by a second plurality of coordinates defining a second geofence or by being outside of the first geographic location.

The first and second SIMs, and any additional SIMs, may be provided in the device in a removable Universal Integrated Circuit Card (UICC) or in an embedded UICC (eUICC) or an integrated UICC (iUICC).

The predefined threshold value may be relative to an RSSI of the first network.

According to a third aspect there is provided a computer program comprising instructions to cause a controller of a mobile telecommunications device to perform the method according to the first aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a non-transitory computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
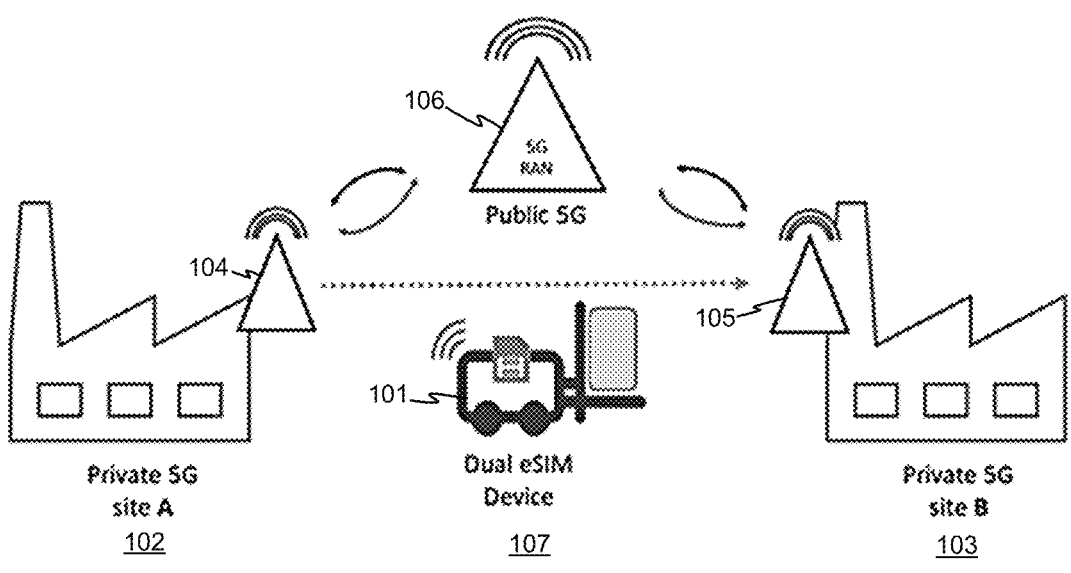
FIG. 1 is a schematic diagram of a dual SIM device moving between geographic locations and different telecommunications networks.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates an dual SIM device 101, which in this example is onboard an autonomous vehicle travelling between first and second sites 102, 103. While the device 101 is within the first site 102, the device 101 is able to connect to a first network, in this example a private 5G network, by connecting to one or more transceivers 104 providing coverage for the first site 102. While travelling from the first site 102 to the second site 103, however, the device 101 goes outside the coverage area of the first site 102 and enters a geographic location 107 that is covered by a second network, in this example a public 5G network provided by one or more transceivers 106. While the device 101 is outside of the coverage of the first network in the first site 102, the device 101 switches from a first SIM to a second SIM to allow the device 101 to remain connected via the public 5G network 106.

When the device 101 is close to the boundary of the first site 102, the RSSI of the first network 104 may be low while the RSSI of the second network 106 is relatively high. However, while the device 101 is within the boundary of the first site 102 it is known that the device 101 is capable of connecting to the first network and the device 101 therefore remains connected to the first network while the device is within a first geographic location defining the first site 102. Only once the device leaves this first geographic location and provided the RSSI of the second network 106 is sufficiently high, does the device switch from the first SIM to the second SIM to connect to the second network. Outside of the first geographic location defining the first site 102 therefore, the device 101 is free to switch to the public network 106 provided its RSSI is sufficiently high, for example if the relative strength of the RSSI of the second network is greater than that of the first network 104.

The device may use existing logical mechanisms to swap SIM profiles in a Universal Integrated Circuit Card (UICC), an embedded UICC (eUICC) or an integrated UICC (iUICC) for mobile network communications, according to the georeferenced coordinates of the mobile telecommunications device 101. The procedure of switching can ensure seamless transition of mobile connections from, for example, a private 5G network to a public 5G network and vice versa, based on the location of the device 101. While RSSI still plays a role, the focus on geographic location as a key factor for network preference ensures that the device 101 stays in an assigned network for as long as possible.

Nevertheless, in case of signal failure the device 101 may still switch over to the public network 106 to ensure continued operation.

Figure 2:
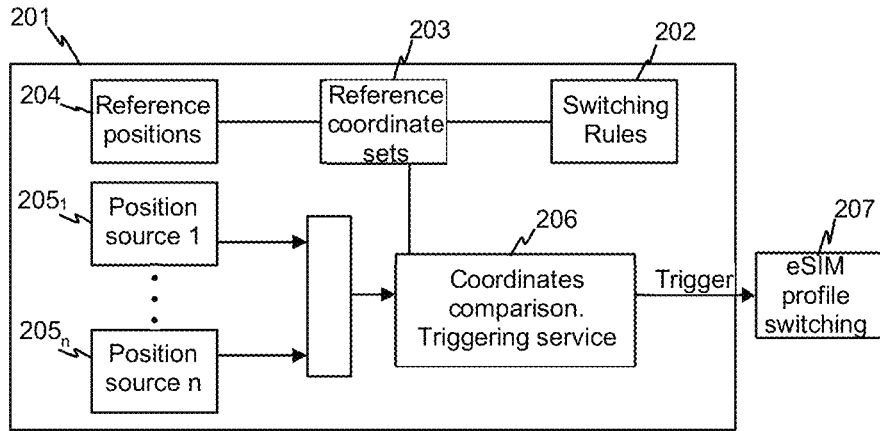
FIG. 2 is a schematic diagram of an example operating system for a controller of a mobile telecommunications device.

FIG. 2 illustrates an example SIM switching mechanism as part of an operating system 201 for a mobile device. The operating system 201 contains switching rules 202, reference coordinate sets 203 and reference positions 204. Position sources 2051-$n$ are provided to a coordinates comparison and triggering service module 206, which determined whether an eSIM profile switching module 207 should be triggered.

Figure 3:
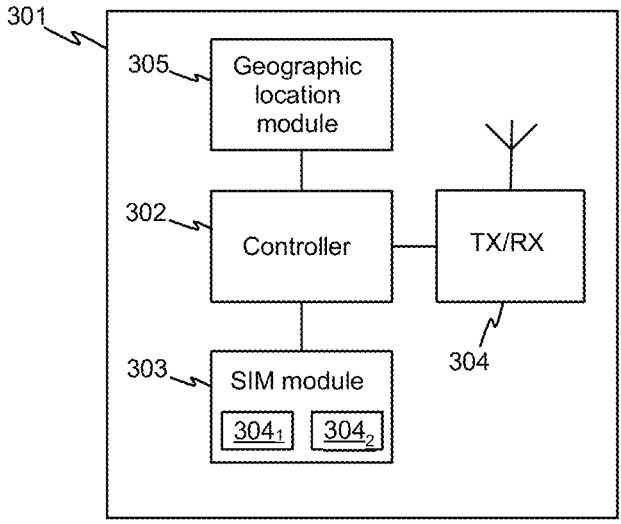
FIG. 3 is a schematic diagram of an example mobile telecommunications device.

FIG. 3 illustrates schematically an example mobile telecommunications device 301. The device 301 comprises a controller 302, on which an operating system including components as described above in relation to FIG. 2 is loaded. A SIM module 303, for example an eUICC module, contains first and second SIMs $304_1$, $304_2$, which the SIM module 303 can switch between on instruction from the controller 302. The SIM module 303 may contain more than two SIMs depending on requirements. In a general aspect, the number of SIMs may be greater than two. A transceiver 304 enables the device 301 to connect to a network depending on which SIM is enabled. A geographic location module 305 enables the device 301 to identify a geographic location of the device. The geographic location module 305 may for example be a GNSS module.

In operation, the mobile device 301 identifies a geographic location using the geographic location module 305, which may for example be a GNSS receiver (e.g. a GPS receiver), a local positioning module (e.g. using UWB localization) or a module that determined position by onboard navigation (e.g., using SLAM approaches). When selecting the network to connect to, the device 301 references its known or estimated geographic location against a list of geofences connected to various switching rules 202, described in further detail below. A geofence encloses a specific region, for example by specifying a set of corner points defining a polygon. Each geofence is described by a set of coordinates, which may be expressed globally (e.g. by GPS coordinates) or with reference to a local coordinate system.

Once the controller 302 has established whether the device 301 is inside any known (or outside of any defined) geofence, it continues to load the switching rules 202 associated with the geofence overlapping with its current position. The switching rules then govern the selection of the network (e.g., "inside geofence A, prefer the private network as long as RSSI is higher than value X"). In case of overlapping geofences, a priority tag assigned to a rule may enable resolution of conflicting rule sets (e.g., rules of higher priority associated with the geofence A override rules of lower priority associated with overlapping geofence B.).

Any geometric construct may be used to describe a geofence. A geofence may for example be defined by a circle of known radius centred on a coordinate, or may be defined by a polygon defined by three or more coordinates. The geofence may be limited by elevation, for example so that a drone flying above a certain height over a particular geographic location may use a different rule set than one flying low above the ground.

Network selection due to RSSI is secondary to rules derived from the geographic location of the device 301. Based on the switching rules, the device 301 switches between different SIM profiles $304_1$, $304_2$ of its onboard SIM module, typically in the form of an eUICC.

Figure 4:
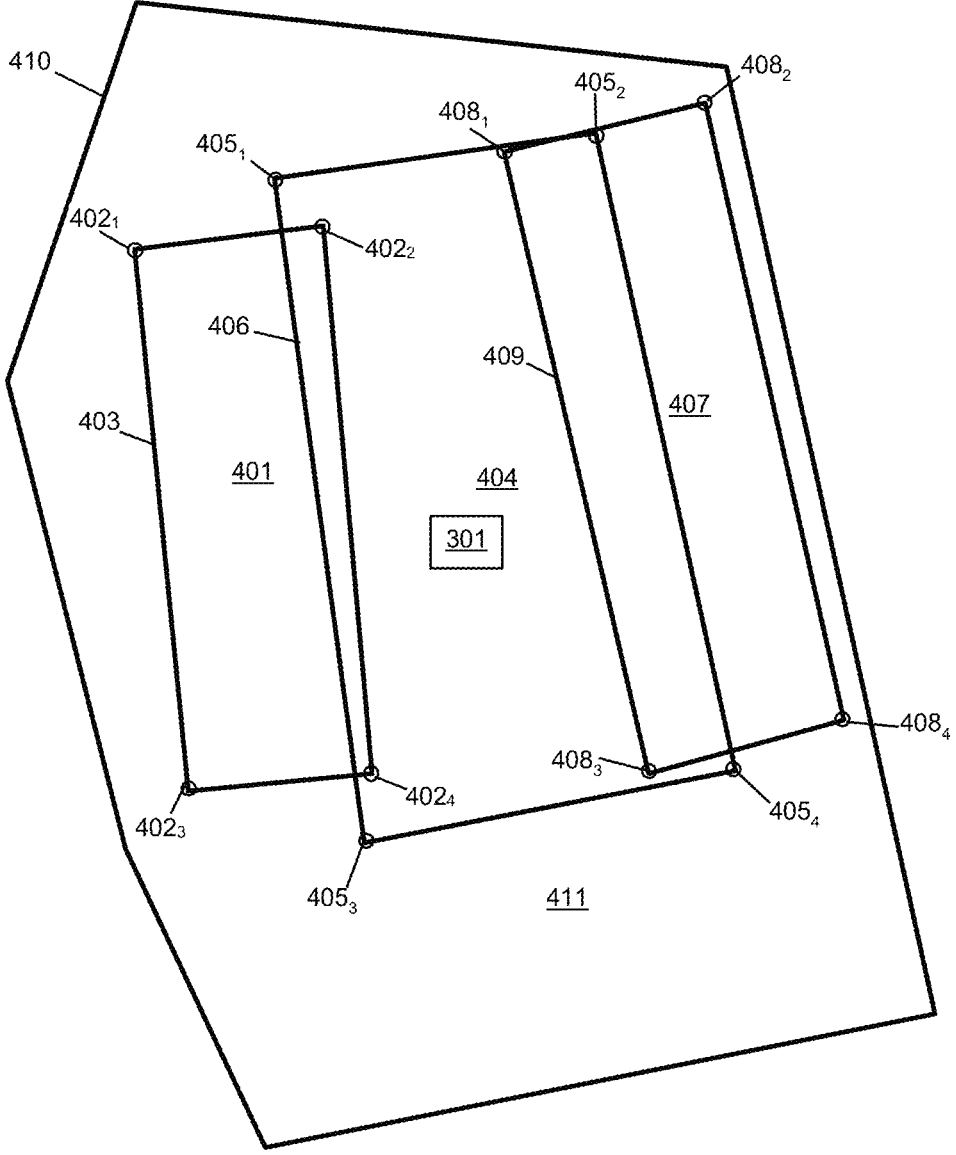
FIG. 4 is a schematic diagram of geofences defining different geographic locations.

FIG. 4 illustrates in plan view a schematic representation of an example site having multiple geographic locations defined by geofences. The entire site is defined by an outer perimeter 410 that encompasses a plurality of geofenced geographic locations. A first geographic location 401 is defined by a first plurality of coordinates $402_{1-4}$ that define a first geofence 403. A second geographic location 404 is defined by a second plurality of coordinates $405_{1-4}$ that define a second geofence 406. A third geographic location 407 is defined by a third plurality of coordinates $408_{1-4}$ that define a third geofence 409. The first and second geographic locations 401, 404 and the second and third geographic locations 404, 407 are partially overlapping. The first geographic location 401 may correspond to the first site 102 and the third geographic location 407 the second site 103, with the second geographic location 404 a region between the first and third geographic locations 401, 407 where a private network covering the first and third geographic locations 401, 407 does not extend. When the device 301 is within the second geographic location 404 the device 301 switches from using the first SIM $304_1$ to using the second SIM $304_2$ provided the RSSI of the second network covering the second geographic location is sufficiently high. If the RSSI from the network covering the first geographic location is still sufficiently high, the device 301 maintains connection with the first network.

Table 1 below summarises the rules that may apply to operation of the device 301 depending on its location and the availability of the first and second networks, the first network covering the first geographic location 401 and the second network covering the second geographic location 404. If the device 301 is outside of the first, second and third geographic locations, i.e. is within a fourth geographic location 411, only the public network, i.e. the second network, is available, so the second network is selected even if the first network is available. If the device 301 is within the second geographic location 404, the device will select the second network but only if the RSSI of the second network relative to the first network is greater than a predefined threshold. If the first network is still useable, which may for example be the case when the device is within an overlap region between the first and second geographic regions 401, 404, the first network may still be selected. Only once the RSSI of the first network falls to a level where a connection is not feasible and the RSSI of the second network is sufficiently high will the device 301 switch to the second SIM to select the second network. If the device 301 is within the first geographic region (or within the third geographic region 407), the first network is always selected by default.

TABLE 1

Network switching rules

| First Network available? | Second Network available? | Rules available |
|---|---|---|
| Yes | Yes | 1. Use only second network |
| | | 2. Use only first network |
| | | 3. Select based on RSSI |
| Yes | No | 1. Use only first network |
| | | 2. n/a |
| | | 3. Select based on RSSI |
| No | Yes | 1. Use only second network |
| | | 2. n/a |
| | | 3. Select based on RSSI |
| No | No | 1. n/a |
| | | 2. n/a |
| | | 3. n/a |

Figure 5:
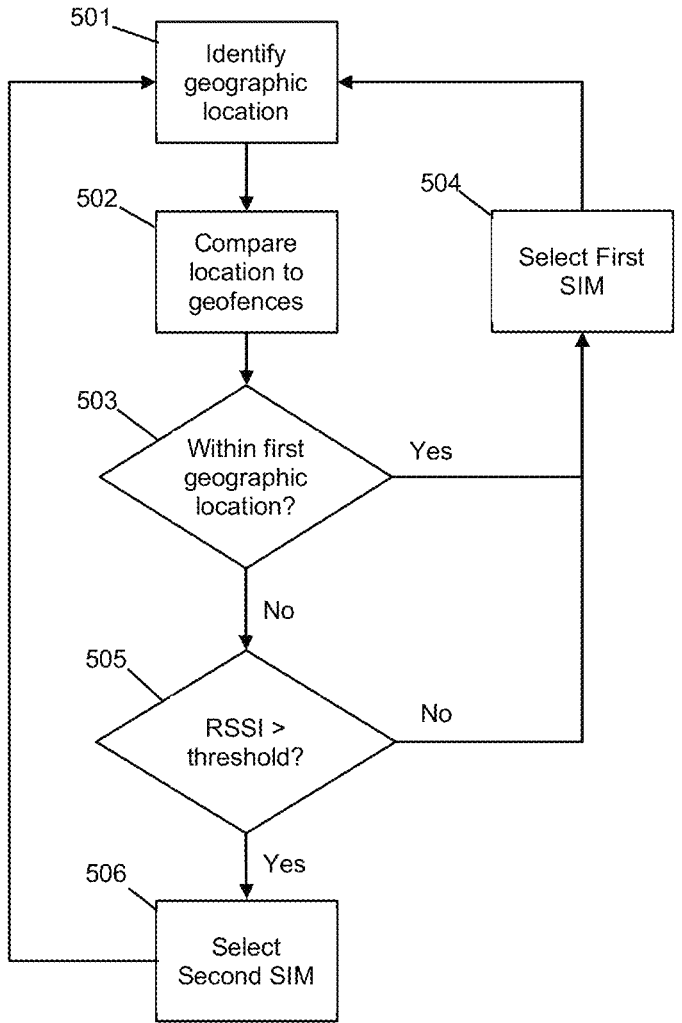
FIG. 5 is a flow diagram illustrating an example method of operating a mobile telecommunications device.

FIG. 5 illustrates schematically an example method of operating the mobile telecommunications device 301 as described herein. In a first step 501, the device identifies a geographic location of the device, for example using GNSS. In a second step 502, a comparison is made between the geographic location of the device and a set of geofences stored in the device 301. In a third step 503, a check is made as to whether the location is within the first geographic location. If yes, in step 504 the first SIM is selected (or is maintained). If no, a check is made at step 505 as to whether the RSSI of the second network is greater than a predefined threshold value. The threshold value may be relative to the RSSI of the first network, for example if the RSSI of the first network is low the threshold value of the second network may be reached. If the threshold is not reached, i.e. the first network is still available, the first SIM is selected or maintained (step 504). If, however, the threshold is reached, the second SIM is selected at step 506. The process then repeats as the device continues to move between the first and second geographic locations. If the first network is a private network and the second network a public network, an advantage of the method is that the use of the second network, for which additional charges may apply, can be limited to only situations where the second network is necessary to maintain connection of the device.

The device and method described herein may be applied in general to any mobile telecommunications devices that require reliable network access over multiple network operators. The benefits, which are particularly relevant to 5G, and beyond 5G, networks, include avoiding high latency, poor bandwidth, outages and other downsides of a weak connection by switching to a second network before losing signal strength. A further benefit is to avoid unnecessary switching where lower performance may be acceptable rather than switching to a second network where charging or lower network security may apply.

From reading the present disclosure, other variations and modifications will be apparent to the skilled person. Such variations and modifications may involve equivalent and other features which are already known in the art of mobile telecommunications systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of operating a mobile telecommunications device having a first subscriber identification module (SIM) and a second SIM, the method comprising:

identifying a geographic location of the device;

operating the device using the first SIM to connect to a first network while the device is within a first geographic location, wherein the first geographic location is defined by a first plurality of coordinates defining a first geofence; and switching to operating the device using the second SIM to connect to a second network once the device leaves the first geolocation as defined by the first geofence and if a received signal strength indicator (RSSI) of the second network is greater than a predefined threshold value.

2. The method of claim 1, wherein the geographic location of the device is identified using a selected one of a local positioning module and a global navigation satellite system (GNSS) receiver on the device.

3. The method of claim 1, wherein the geographic location of the device is identified using a local positioning module using UWB localization.

4. The method of claim 1, wherein the second network corresponds to a second geographic location and the second geographic location is defined by a second plurality of coordinates defining a second geofence.

5. The method of claim 1, wherein the second network corresponds to a second geographic location and the second geographic location is defined by being outside of the first geographic location.

6. The method of claim 1, wherein the first and second SIMs are provided in the device in a selected one of a Universal Integrated Circuit Card (UICC), an embedded UICC and an integrated UICC.

7. The method of claim 1, wherein the first network is a selected one of a LTE network, a 5G network and a 6G network.

8. The method of claim 7, wherein the second network is a selected one of an LTE network, a 5G network and a 6G network.

9. The method of claim 1, wherein the predefined threshold value is relative to an RSSI of the first network.

10. A mobile telecommunications device comprising:

a geographic location module;

a controller;

a first subscriber identification module (SIM);

a second SIM; and a transceiver, wherein the controller is configured to:

identify a geographic location of the device using the geographic location module;

operate the device using the first SIM and the transceiver to connect to a first network if the device is within a first geographic location, wherein the first geographic location is defined by a first plurality of coordinates defining a first geofence; and switch to operate the device using the second SIM to connect to a second network once the device leaves the first geolocation as defined by the first geofence and if a received signal strength indicator (RSSI) of the second network is greater than a predefined threshold value.

11. The device of claim 10, wherein the geographic location module comprises a selected one of a local positioning module and global navigation satellite system (GNSS) receiver.

12. The device of claim 10, wherein the geographic location module comprises a local positioning module using UWB localization.

13. The device of claim 10, wherein the second network corresponds to a second geographic location and the second geographic location is defined by a second plurality of coordinates defining a second geofence.

14. The device of claim 10, wherein the second network corresponds to a second geographic location and the second geographic location is defined by being outside of the first geographic location.

15. The device of claim 10, wherein the first and second SIMs are provided in the device in a selected one of a Universal Integrated Circuit Card (UICC), an embedded UICC and an integrated UICC.

16. The device of claim 10, wherein the predefined threshold value is relative to an RSSI of the first network.

17. The method of claim 10, wherein the first network and the second network are each a selected one of an LTE network, a 5G network and a 6G network.

18. A non-transitory computer readable medium comprising instructions to cause a controller of a mobile telecommunications device having a first subscriber identification module (SIM) and a second SIM to:

identify a geographic location of the device using a geographic location module;

operate the device using the first SIM to cause a transceiver to connect to a first network if the device is within a first geographic location, wherein the first geographic location is defined by a first plurality of coordinates defining a first geofence; and switch to operate the device using the second SIM to cause the transceiver to connect to a second network once the device leaves the first geolocation as defined by the first geofence and if a received signal strength indicator (RSSI) of the second network is greater than a predefined threshold value.

19. The method of claim 1, wherein the first plurality of coordinates defining the first geofence is stored in the mobile telecommunications device.

20. The method of claim 1, wherein the first network is a private network and the second network is a public network.

21. The method of claim 1, wherein the first network is a private 5G network and the second network is a public 5G network.

* * * * *